April 26, 1960   H. B. STONER ET AL   2,934,192
COIN CONTROL MECHANISM FOR VENDING MACHINES
Filed Sept. 19, 1957   11 Sheets-Sheet 1
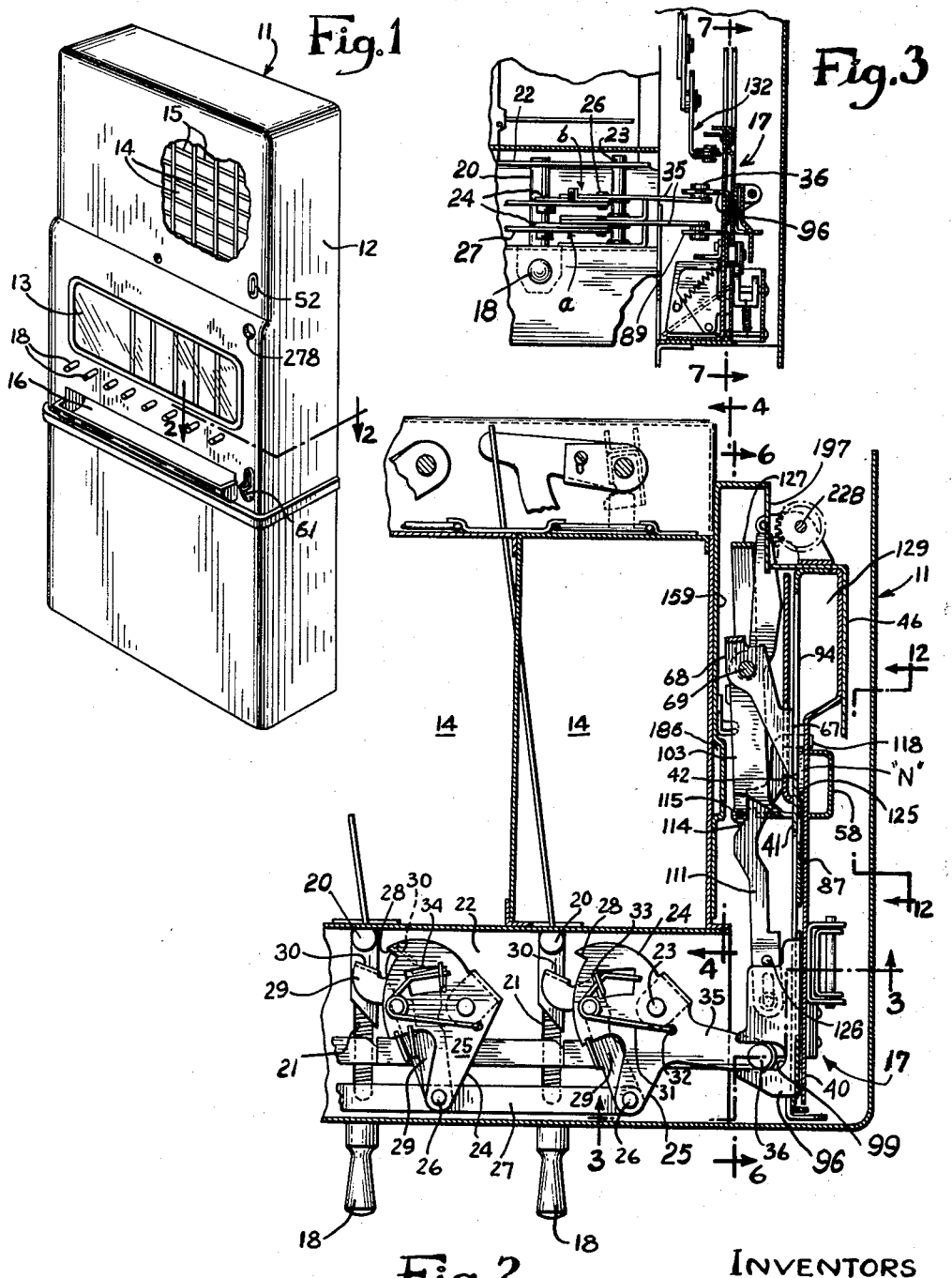
INVENTORS
HARRY B. STONER
HENRY J. ALBRIGHT
by: *[signature]*
ATTY.

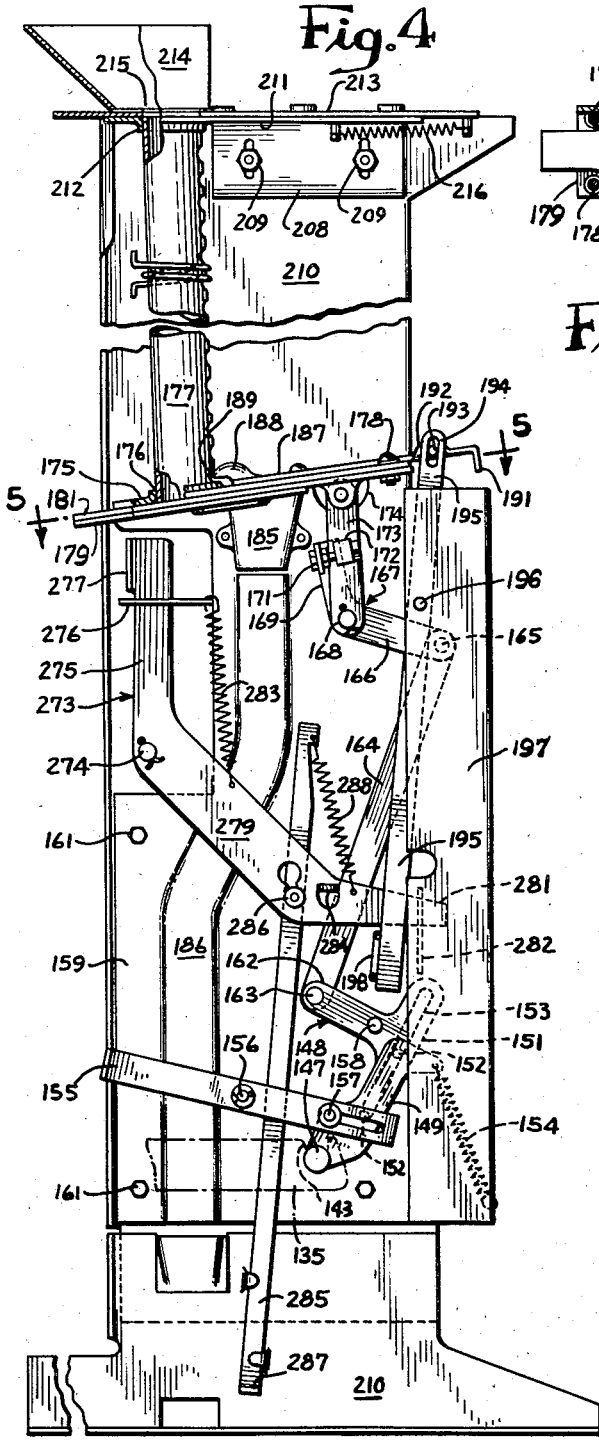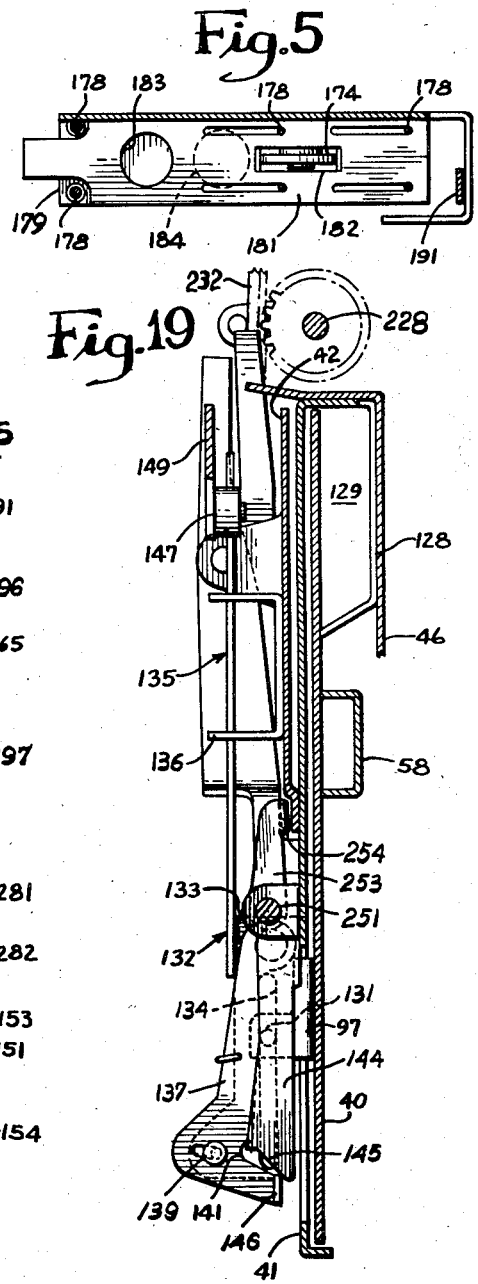

April 26, 1960 H. B. STONER ET AL 2,934,192
COIN CONTROL MECHANISM FOR VENDING MACHINES
Filed Sept. 19, 1957 11 Sheets-Sheet 3

INVENTORS
HARRY B. STONER
HENRY J. ALBRIGHT
by:
ATTY.

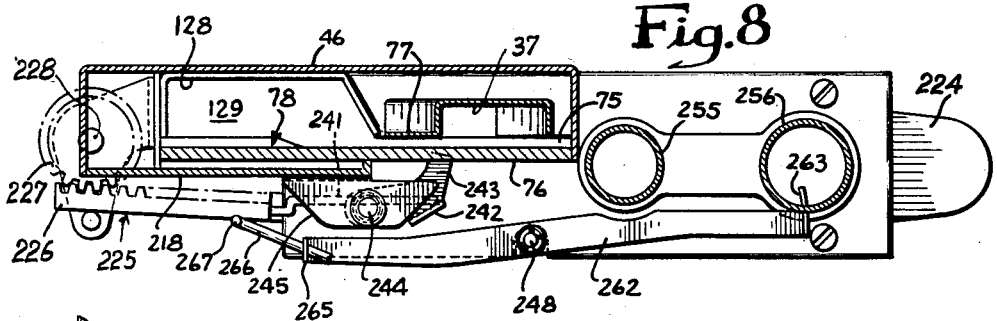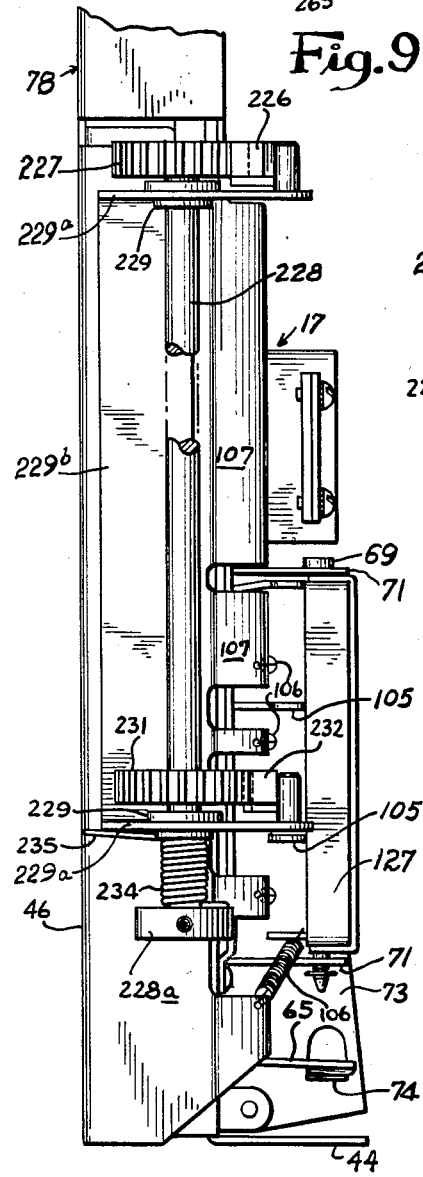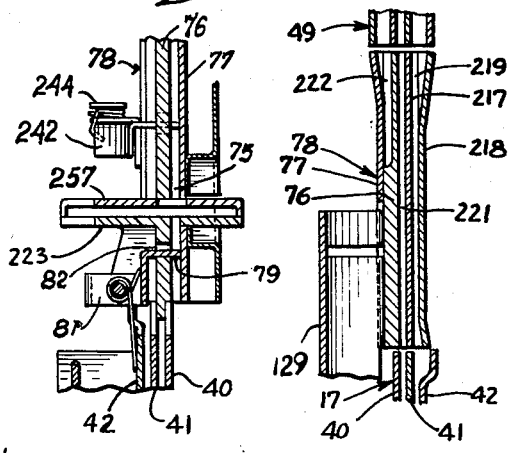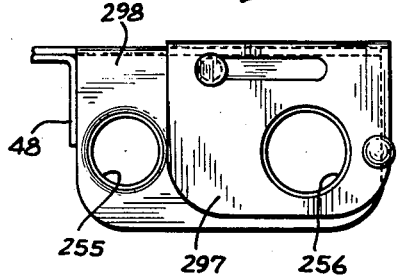
INVENTORS
HARRY B. STONER
HENRY J. ALBRIGHT

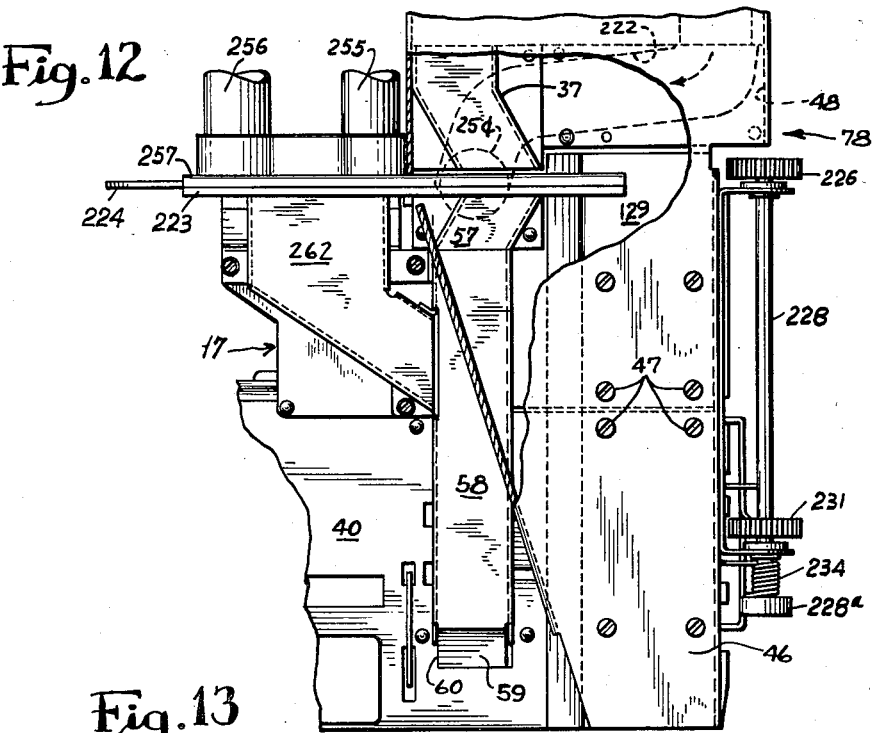
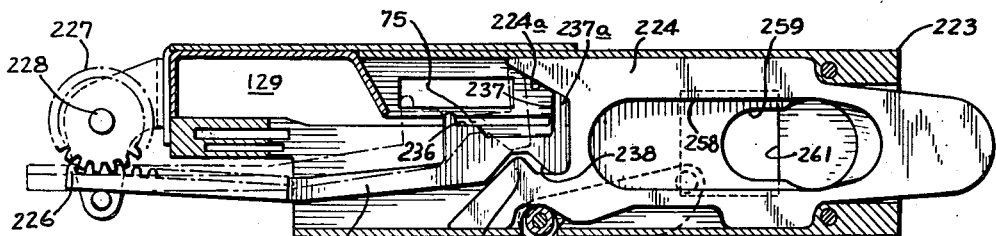
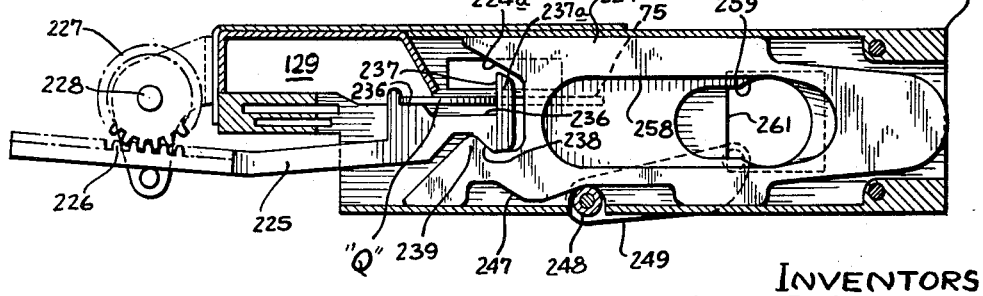

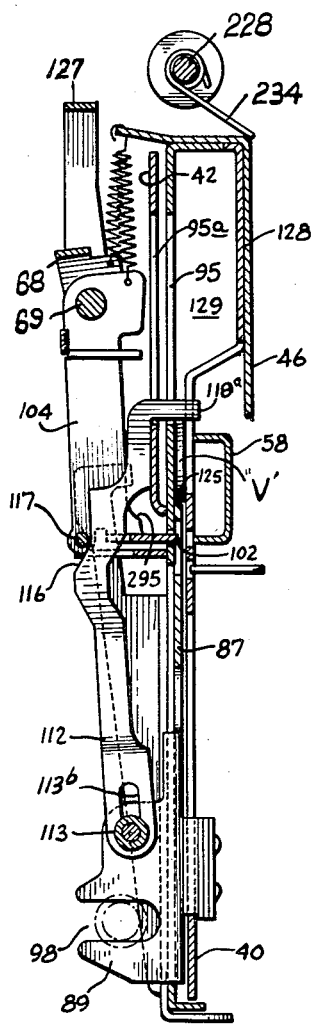
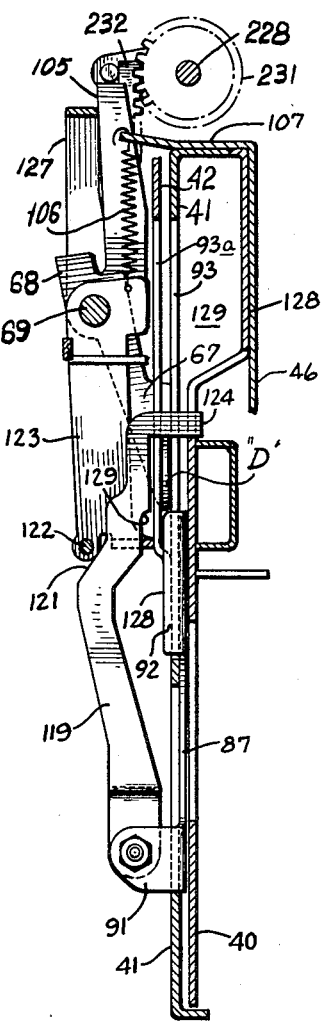
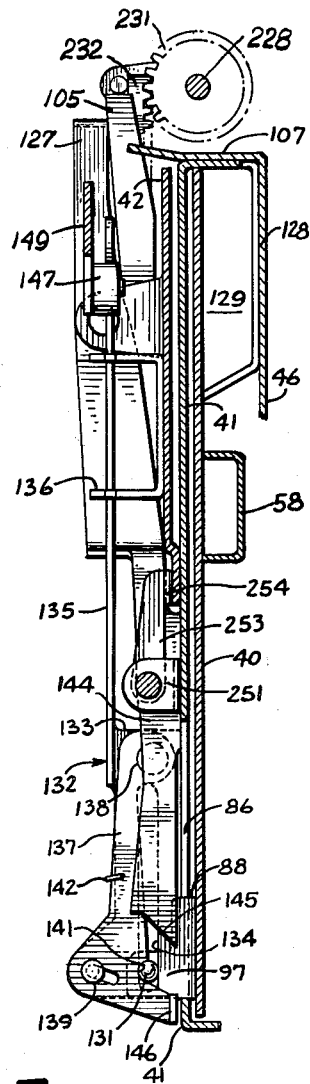

INVENTOR.
HARRY B. STONER
BY HENRY J. ALBRIGHT
ATTY.

INVENTOR.
HARRY B. STONER
BY HENRY J. ALBRIGHT.
Atty.

April 26, 1960 H. B. STONER ET AL 2,934,192
COIN CONTROL MECHANISM FOR VENDING MACHINES
Filed Sept. 19, 1957 11 Sheets-Sheet 10
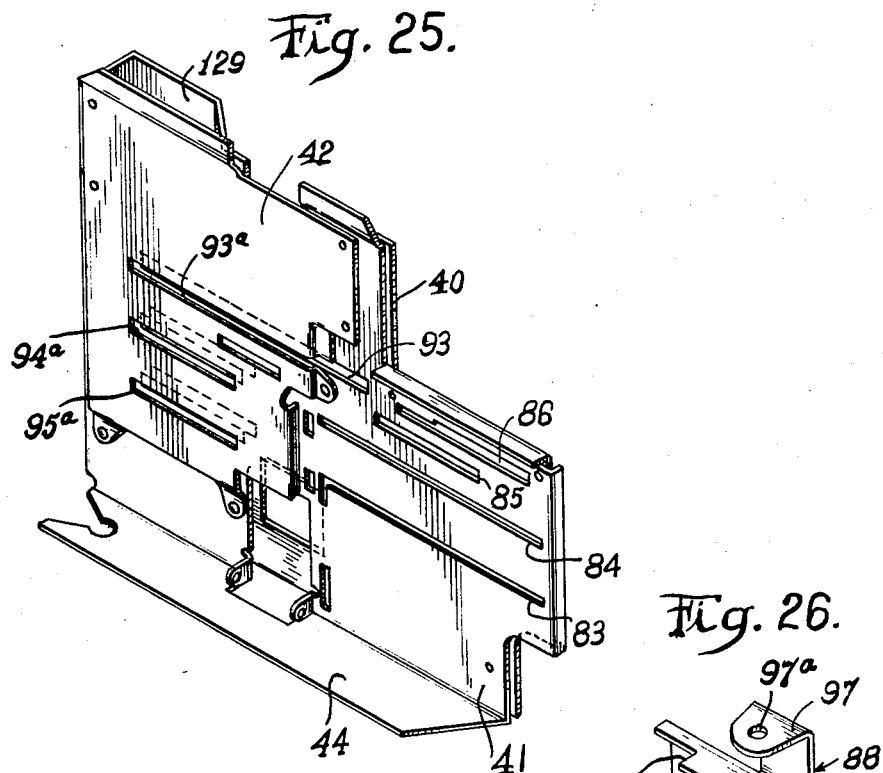
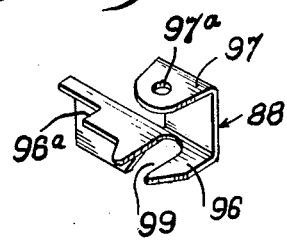
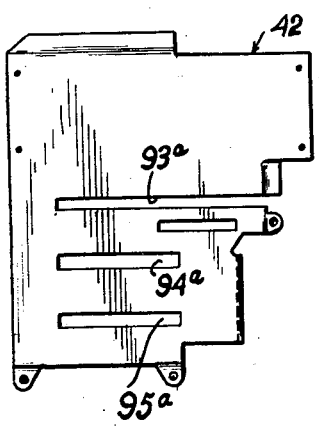
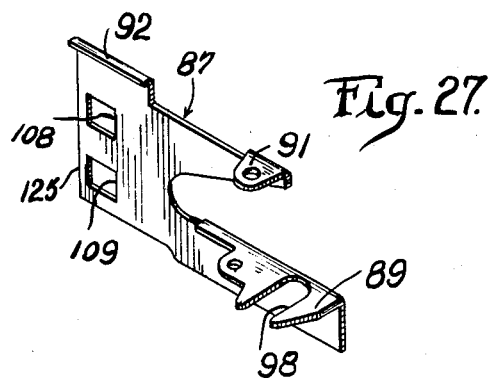
INVENTOR.
HARRY B. STONER
BY HENRY J. ALBRIGHT
ATTY.

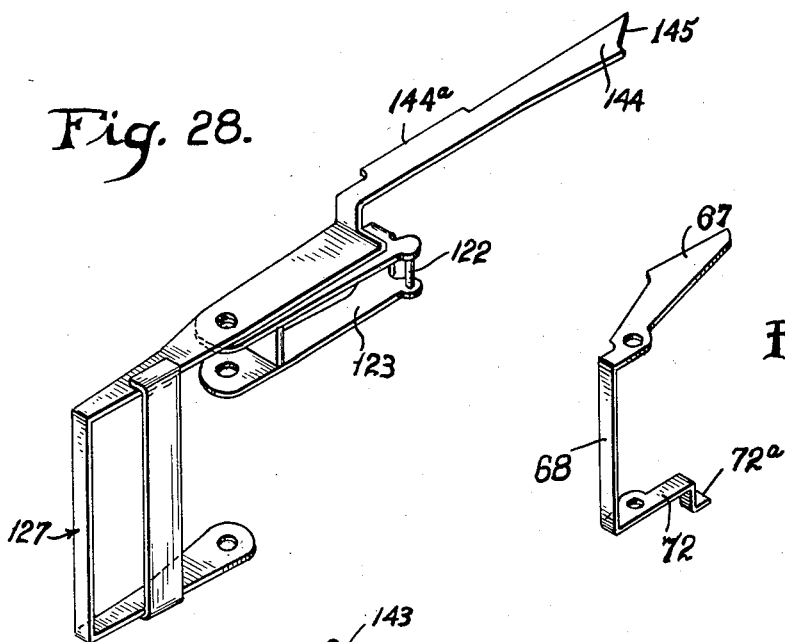
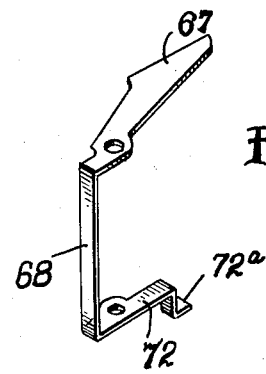
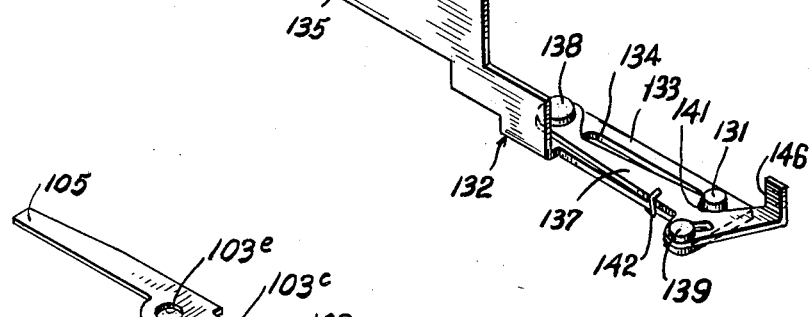
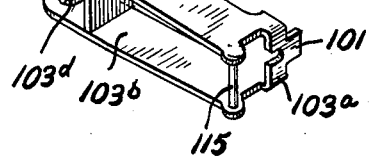

United States Patent Office 2,934,192
Patented Apr. 26, 1960

2,934,192

COIN CONTROL MECHANISM FOR VENDING MACHINES

Harry B. Stoner and Henry J. Albright, Aurora, Ill., assignors, by mesne assignments, to The Vendo Company, Kansas City, Mo., a corporation of Missouri Application September 19, 1957, Serial No. 684,872

10 Claims. (Cl. 194—55)

The invention relates to improvements in vending machines and particularly to merchandise vending machines including novel, normally locked coin-controlled mechanism of the type adapted to be unlocked to permit the dispensing of merchandise having predetermined prices upon the insertion of a coin or coins of a predetermined value and totaling or exceeding a predetermined price, and to cause the vending of one or more coins as change when coins of predetermined values and exceeding predetermined prices are inserted. More particularly, the invention resides in novel mechanism operable in response to actuation of the coin-controlled mechanism for returning to the operator, as change, one or more coints of predetermined denominations and totalling a predetermined value when the lock mechanism is unlocked by the deposit of different coins having a greater predetermined value than the predetermined price of the article purchased.

The coin-controlled mechanism disclosed is intended for operation upon the deposit of one five-cent coin to unlock the vending machine and permit the vending of merchandise having a value of five cents. Similarly, it will operate following the deposit of two five-cent coins, one ten-cent coin or a twenty-five-cent coin to permit vending of merchandise valued at ten cents and when one ten-cent coin or a twenty-five cent coin is deposited, the machine may be operated to permit the vending of merchandise valued at five cents. The mechanism functions also, upon the deposit of a ten-cent coin for merchandise valued at five cents, to vend as change one five-cent coin. When a twenty-five cent coin is deposited for merchandise valued at five cents, twenty cents in coins is vended as change, whereas if the merchandise purchased is valued at ten cents, only fifteen cents is vended as change.

Although the present disclosure and this specification refers to operation of the coin-controlled mechanism and change-vending mechanism by insertion of five, ten or twenty-five cent coins for the selective purchase of merchandise having a value of five or ten cents and the vending of five and ten-cent coins as change, it is to be understood that this reference to specific coins and prices is illustrative only and that the mechanism may be constructed to operate in a similar manner on coins of other values for the purchase of merchandise of other values.

Briefly recited, the coin-controlled mechanism is operatively connected to and normally locks the merchandise vending machine against vending operation and is constructed to receive a coin or coins of predetermined values which are held therein by coin-receiving means in such positions that, upon initial selective operation of the vending machine, the coin or coins co-act with coin-sensing means to actuate means for unlocking the coin-controlled mechanism and permit vending operation of the machine. In instances when a coin of predetermined value greater than the value of the merchandise selected for purchase is deposited in the coin-controlled mechanism, means is actuated to unlock said coin-controlled mechanism and to release and deliver to the operator a coin or coins having a total value equal to the difference between the price of the selected merchandise and the value of the coin deposited.

For example, when a ten-cent coin is deposited for the purchase of a five-cent piece of merchandise one five-cent coin is vended as change. When a twenty-five cent coin is deposited for a ten-cent piece of merchandise one five-cent coin and one ten-cent coin is vended as change, and when a five-cent piece of merchandise is purchased following the deposit of a twenty-five cent coin, there is vended to the purchaser two five-cent coins and one ten-cent coin. The vending, as change, of one or more coins of like or different denominations totaling a predetermined value is accomplished in the present disclosure by providing two separately operated coin vending mechanisms, operably connected with the coin-controlled mechanism for individual or joint operation therewith. One of the coin vending mechanisms comprises a container for a supply of five-cent coins and operable means to discharge one coin at a time selectively. The other coin vending mechanism is comprised of two coin containers, one for five-cent coins and the other for ten-cent coins, having common discharge mechanism.

It is therefore an object of the present invention to provide, in a coin-controlled vending machine, novel means to contain and to discharge a coin or coins of predetermined values and totaling predetermined amounts upon the deposit of coins of predetermined values that are greater than the value of the merchandise to be purchased.

Another object is to provide a novel coin-controlled mechanism for a vending machine.

Another object of the invention is to provide a novel coin-controlled mechanism and novel means operably connected thereto for vending, as change, a coin or coins of predetermined denominations.

Another object is to provide a plurality of novel coin-vending mechanisms and novel means connecting said coin-vending mechanisms with a coin-controlled mechanism for selective operation in unison therewith.

Another object is to provide a normally locked coin-controlled mechanism for a vending machine which is unlocked in the presence of one or more coins of predetermined denominations and totaling a predetermined value equal to or greater than the predetermined price of merchandise to be vended.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view of a merchandise vending machine embodying the features of the present invention, showing parts thereof broken away to more fully illustrate the details of its construction.

Fig. 2 is a fragmentary horizontal sectional view taken substantially on line 2—2 of Fig. 1.

Fig. 3 is a vertical sectional view taken substantially on line 3—3 of Fig. 2.

Fig. 4 is a vertical sectional view taken substantially on line 4—4 of Fig. 2.

Fig. 5 is a horizontal sectional view taken substantially on line 5—5 of Fig. 4.

Fig. 7 is a fragmentary vertical sectional view through the coin-controlled mechanism taken substantially on line 7—7 of Fig. 3.

Fig. 8 is an enlarged horizontal sectional detail view of the coin-controlled mechanism taken substantially on line 8—8 of Fig. 6.

Fig. 9 is a fragmentary end elevational view of the coin-controlled mechanism taken substantially along the line 9—9 of Fig. 6.

Fig. 10 is a vertical sectional view taken substantially on line 10—10 of Fig. 6.

Fig. 11 is a vertical sectional view taken on line 11—11 of Fig. 6.

Fig. 12 is a fragmentary elevational view of the outside face of the coin-controlled mechanism as viewed in the direction of the arrows 12—12 on Fig. 2.

Fig. 13 is a horizontal detail sectional view taken substantially on line 13—13 of Fig. 6.

Fig. 14 is a sectional detail view similar to Fig. 13 showing the coin-slide in a position of adjustment during operation thereof.

Fig. 15 is a plan view of the change-coin container filling openings, as viewed substantially along line 15—15 of Fig. 6.

Fig. 16 is a horizontal sectional view taken substantially along line 16—16 of Fig. 6.

Fig. 17 is a horizontal sectional view taken substantially on line 17—17 of Fig. 6.

Fig. 18 is a horizontal sectional view taken substantially on line 18—18 of Fig. 6 showing the mechanism at rest.

Fig. 19 is a horizontal sectional view substantially like Fig. 18, but showing the mechanism in a position assumed during operation when no change coin is to be discharged from a selected one of the coin containing means.

Figure 22:
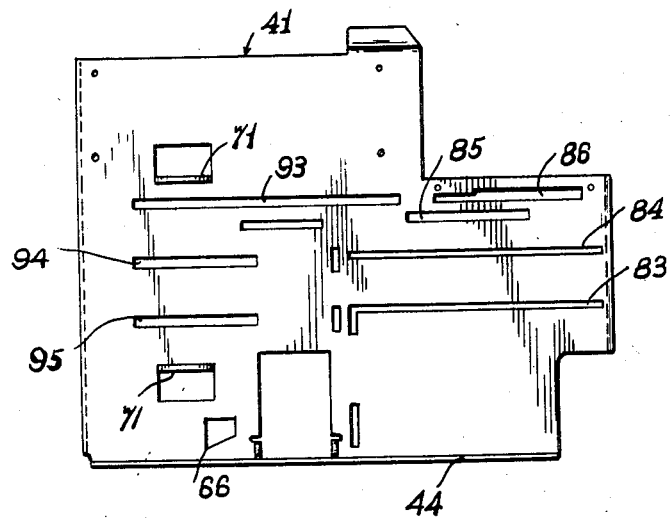
Figure 23:
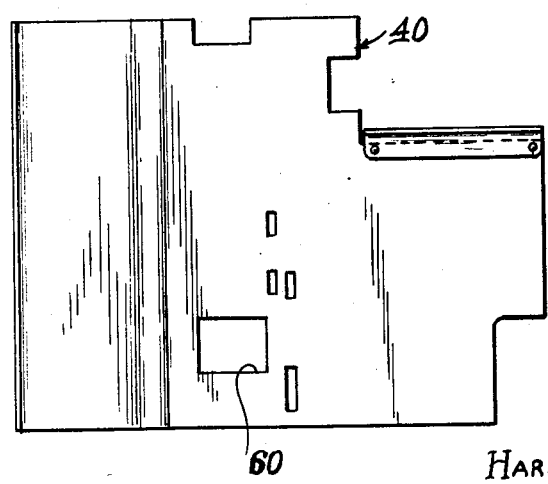

Figs. 22 to 24 inclusive are side elevational views of the three plates constituting the plate assembly.

Fig. 25 is a perspective view of the plate assembly showing the three plates of Figs. 22 to 24 in assembled relation.

Fig. 26 is a perspective detail view of one of the two slide plates.

Fig. 27 is a perspective detail view of the other slide plate.

Fig. 28 is a perspective detail view of one of the locking members shown in assembled relation with a U-shaped element secured thereto.

Fig. 29 is a perspective detail view of a U-shaped member.

Fig. 30 is a perspective detail view of a drive slide and latch pivotally mounted thereto.

Fig. 31 is a perspective detail view of another locking member.

Referring to the accompanying drawings and particularly to Figures 1 and 2, the reference character 11 generally indicates a merchandise vending machine of the kind in which the present coin-controlled lock mechanism and change-making mechanism is incorporated. The vending machine illustrated includes a cabinet 12 having a window opening 13 through which facsimiles of merchandise contained in a plurality of stacks within the machine may be viewed. The stacks of merchandise are contained within an assembly of vertical racks, generally indicated at 14. Each rack includes a plurality of shelves or platforms 15 disposed in spaced relation one above the other to provide a plurality of compartments each adapted to contain one piece of the merchandise.

The specific construction of the racks 14 and the manner of mounting the platforms 15 and controlling their selective function to dispense merchandise forms no part of the present invention and is fully disclosed and claimed in Stoner Patent No. 2,324,040 and, because other means may be provided for dispensing merchandise from the racks 14, the specific details of construction will not be discussed herein. It is, however, sufficient to note at this time that upon selective manipulation of manually actuable means associated with each rack, and to be described hereinafter, one of the platforms 15 is displaced so as to permit a piece of merchandise supported thereby to drop into a dispensing chute for delivery to a receiving tray 16 provided on the front side of the vending machine.

*Merchandise vending machine*

The manually actuable means effective to vend a piece of merchandise is best illustrated in Figures 2 and 3. This actuable means normally is held against manual operation by a coin-controlled lock mechanism, generally indicated at 17 in said figures, mounted on one end of the bank of merchandise racks 14. Although this mechanism is substantially like the coin-controlled lock mechanism disclosed and claimed in Stoner et al. Patent No. 2,655,244, dated October 13, 1953, certain novel elements have been incorporated therein to adapt it to function in cooperation with means for vending, as change, one or a plurality of coins upon deposit of a coin or coins of predetermined denominations having a value in excess of the value of the merchandise to be dispensed. Consequently, said mechanism will be described in detail hereinafter.

The specific coin-controlled lock mechanism 17 is of a kind adapted to selectively release and render operable any selected one of the manually actuable merchandise dispensing means associated with each of the racks 14. Operation of the merchandise dispensing means is effected by the customer operating a selected one of a plurality of reciprocal plungers 18 extending outwardly of the front face of the vending machine cabinet 12. The dispensing means directly associated with each plunger 18 may be adjusted to adapt the particular rack associated therewith for containing and dispensing merchandise having a value of five cents or ten cents. Each plunger 18 carries a vertical rod 20 which extends upwardly therefrom through a guide slot 21 provided in the upper flange 22 of a guide channel arranged on the front side and adjacent the lower ends of the racks 14. Inasmuch as the construction of the dispensing means associated with each rack is identical, with variations in the mechanical adjustment of certain parts thereof, the following description concerns itself with one such means only, it being understood that it is equally applicable to each of the other like means in the vending machine.

A vertical journal pin 23 provided closely adjacent to the plunger 18 is firmly secured at its ends in the upper flange 22 and lower flange (not shown) of the channel mentioned hereinabove. Pin 23 carries, for free rotation thereon, a pair of crank-arms 24, one located above the other and suitably spaced apart as best shown in Fig. 3. Each crank-arm has a forwardly extending ear 25 apertured to receive a pintle pin 26 for pivotally connecting the ends of said ears one to each of a pair of drawbars 27 which extend longitudinally across the front of the guide channel. The crank-arms 24 in each pair are disposed in horizontal rows (identified as "a" and "b" in Fig. 3) and each drawbar 27 is connected with all of the crank-arms in a respective one of the rows.

Each crank-arm 24 has an enlarged body portion including a shoulder 28 normally disposed closely adjacent to the vertical rod 20 on the related plunger 18. Triggers 29, one associated with each crank-arm 24, are each pivotally mounted at one end on the related pintle pin 26, and each has a downwardly extending lug 30 on its other end which normally lies in the path of the associated vertical rod 20. Springs 31, anchored at 32 on each crank-arm 24, have one end engaged in an ear 33 extending integrally from one edge of the related trigger 29 which extends upwardly through an arcuate slot 34 in the related crank-arm 24. Each of the crank-arms 24 constituting the pair thereof at the extreme right-hand end of the vending machine, as viewed in Figures 2 and 3, has an arm extension 35 each carrying a knob or roller 36 which has operating engagement with the coin-controlled lock mechanism 17. This coin-controlled mechanism is effective normally to prevent actuation of any set or sets of actuating crank-arms 24 and consequently locks the vending machine against operation.

Still referring to Figs. 2 and 3, it will be observed that the lugs 30 on all of the triggers 29 of the lower or "a" row of crank-arms 24 are disposed in the path of the vertical rod 20 so that when any one of the plungers 18 is pulled outwardly to operate the vending machine the associated lower crank-arm 24 is swung about its journal pin 23 thus shifting the lower drawbar 27 connected therewith longitudinally across the front of the machine.

The vending machine disclosed herein is adapted to vend merchandise having different predetermined values. Accordingly all of the crank-arms 24 in the upper or "b" row are adapted to be selectively adjusted for engagement by the vertical rod 20 when the related plunger 18 is pulled outwardly. Each upper crank-arm 24 has its trigger lug 30 positioned either for engagement or non-engagement by the vertical rod 20 when said rod moves outwardly toward the front of the machine. In the present disclosure, outward pulling of the plunger 18 associated with the right-hand rack shown in Fig. 2 will engage the rod 20 with the trigger lug 30 of both crank-arms 24 associated therewith, provided of course that the coin-controlled mechanism 17 has been conditioned for unlocking the vending machine by the insertion of a coin or coins of the proper denominations. Still referring to Fig. 2, the trigger lug 30 on the upper, or "b" crank-arm 24 associated with the other or second merchandise rack illustrated has been selectively positioned so that movement of the plunger 18 associated therewith will impart rotation to the lower or "a" crank-arm 24 only, provided again that the coin-controlled mechanism has been conditioned to permit such actuation.

The normally locked coin-controlled mechanism 17 which embodies features of the present invention is constructed to unlock to permit selected longitudinal sliding of either or both of the drawbars 27 and consequent operation of a selected merchandise dispensing mechanism upon the insertion of one or more coins of predetermined denominations to permit vending of merchandise having a value corresponding to or less than the total value of the coin or coins deposited. In the present instance the coin-controlled mechanism 17 is constructed to accommodate one or two five-cent coins, one ten-cent coin or a twenty-five cent coin in order to be unlocked to permit vending of merchandise having a value of either five or ten cents.

In instances when a five-cent coin is deposited, suitable mechanism contained within the coin-controlled mechanism 17 is conditioned to permit unlocking of the parts in such manner that a plunger 18 effective to rotate both crank-arms 24 in the pair associated therewith (the right-hand pair in Fig. 2) may be manipulated and any attempt to manipulate a plunger 18 (such as the left-hand plunger in Fig. 2) operatively associated with but the lower one 24a of its two related crank-arms 24a, 24b is prevented. Similarly when two five-cent coins or a ten-cent coin are deposited in the coin-controlled mechanism for the purpose of obtaining merchandise having a value of ten cents said mechanism is unlocked to the extent that it will only permit operation of a plunger 18 (the left-hand plunger in Fig. 2) actuable to rotate but one of the two crank-arms 24 associated therewith. In a like manner the coin-controlled mechanism 17 may be unlocked upon the deposit of a twenty-five cent coin so as to permit operation of any one of the plungers 18 to obtain merchandise valued at either five or ten cents. Further should a customer, wishing to obtain merchandise having a value of five cents, deposit a ten-cent coin in the coin-controlled mechanism 17, said mechanism will be conditioned to permit rotation of both crank-arms 24 associated with a selected plunger so as to discharge a five-cent piece of merchandise and in addition will actuate means to release and vend a five-cent coin as change. Should the customer deposit a twenty-five cent coin to purchase merchandise valued at five cents, the coin-controlled mechanism is unlocked and, upon operation of a predetermined selected plunger, said mechanism functions to deliver to the customer twenty cents in change, said change comprising two five-cent coins and one ten-cent coin. When a twenty-five cent coin is deposited for the purchase of merchandise having a value of ten cents, the coin-controlled mechanism 17 is unlocked to permit operation of the vending machine and it also functions to vend fifteen cents in change, said change comprising one five-cent coin and a ten-cent coin.

Having generally outlined the mode of operation and means effective to obtain selective operation of the various mechanisms for vending merchandise having a value of either five or ten cents and for vending change in the event the deposited coin exceeds the value of the merchandise, the following description will be concerned with the specific details of construction of the coin-controlled mechanism and the change vending mechanism.

*Coin-controlled mechanism*

Figure 6:
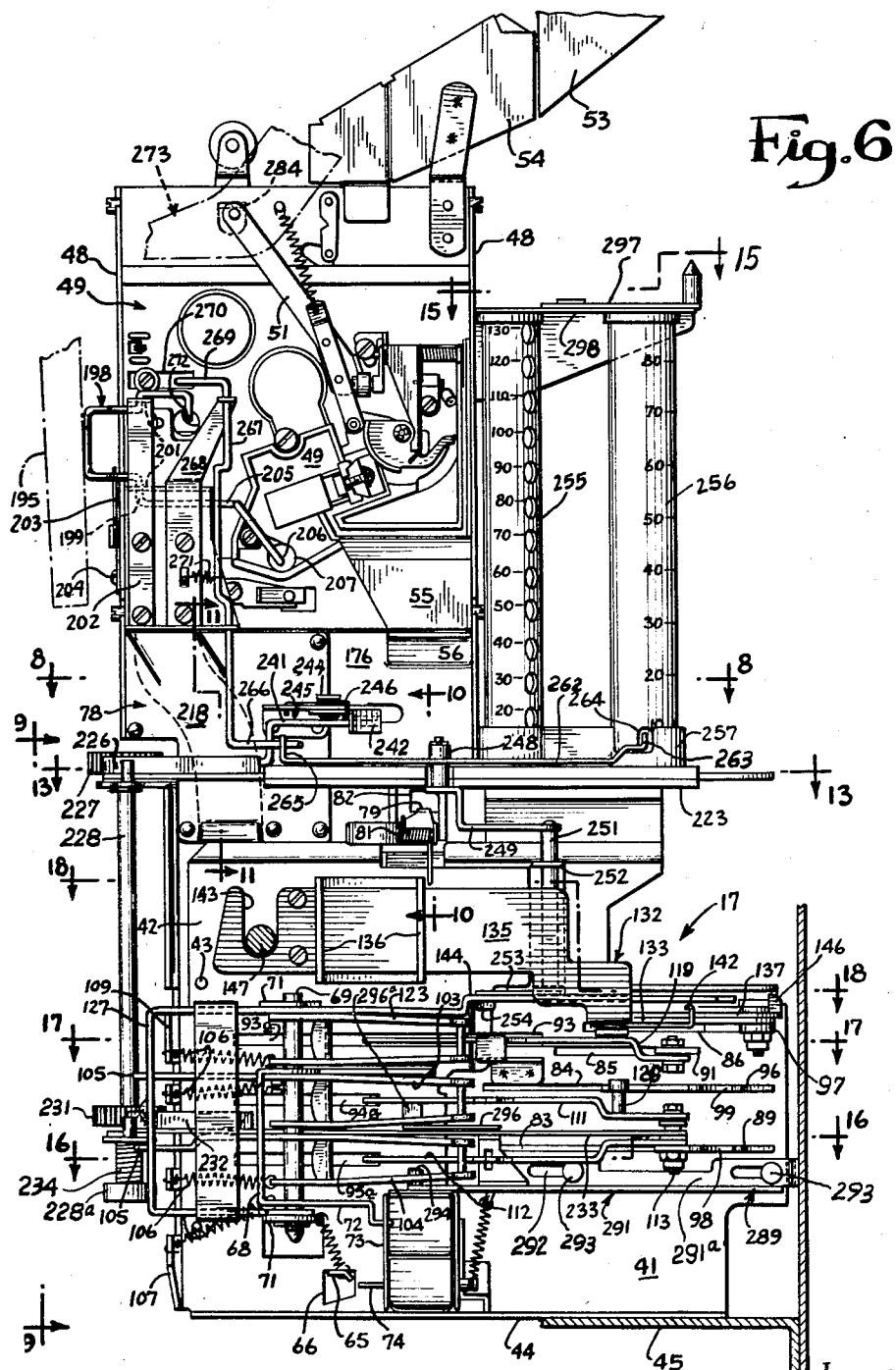
Fig. 6 is an elevational view of the coin-controlled mechanism as viewed in a direction opposite to that of Fig. 4 and taken substantially along line 6—6 of Fig. 2.

The coin-controlled lock mechanism 17 is best illustrated as a whole in Figures 6 and 12. It includes a plate assembly comprising an outside plate 40 (Figs. 12, 23 and 25) and an inside plate 41 (Figs. 6, 22 and 25) and an auxiliary plate 42 (Figs. 6, 24 and 25). These plates may be joined together by rivets 43 which extend through the plates they are intended to secure. Suitable means is provided in the area of said rivets to maintain the plates in spaced relationship with the distance between them being slightly greater than the thickness of the coins the mechanism is designed to accept. In the present disclosure (see Figs. 16–19) the space between the plates 40 and 41 corresponds to the thickness of a five-cent coin. The space between the plates 41 and 42 corresponds to the thickness of a ten-cent coin, thus providing coin-receiving passageways between the respective plates.

The plate 41 is provided on its bottom edge with a base flange 44 to facilitate mounting the mechanism firmly in a vertical position on a floor plate 45 constituting a part of the vending machine. A mounting plate 46 (Fig. 12) is secured by screws 47 to the outside face of the outside plate 40 and it extends upwardly beyond the upper edge of plate 40 and is provided with spaced flanges 48 (Fig. 6) on each vertical edge thereof to mount a rejector 49 in vertical alignment with and above the coin-controlled mechanism 17.

The rejector 49 is of standard construction and because it forms no part of the present invention it is not believed to be necessary to describe the same in great detail. It may be observed, however, that said rejector includes the usual magnets and cradles for detecting fraudulent coins and accepting proper coins, and a jam release mechanism including a trigger 51 actuable to operate said jam release mechanism. The specific means provided for actuating said jam release trigger 51 does not constitute a part of the present invention and is not disclosed herein.

When a coin is deposited in a coin-receiving slot 52 (Fig. 1) provided in the vending machine cabinet 12, said coin will move downwardly through troughs 53, 54 (Fig. 6) into the rejector 49. Should the coin be fraudulent or of a denomination which the rejector is not conditioned to receive, said coin will drop into a return chute 55 provided on the front face of the rejector (Fig. 6) and be directed into a chute 56 for delivery into a substantially vertical duct 57—58 (Fig. 12) mounted on the outside face of the outside plate 40. The lower end of the duct 58 has an inclined surface 59 which extends through an opening 60 in both plates 40 and 41 so as to direct the coin in the coin-return ledge 61 (Fig. 1) provided on the front of the vending machine cabinet.

When a coin or coins of predetermined denominations totaling a predetermined value are deposited in the rejector 49, said coins are directed into selected positions to permit actuation of the coin-controlled mechanism 17. For example, when a five-cent coin is deposited said coin will enter into the space between the plates 40 and 41 and will come to rest on coin-supporting means preferably in the form of a stop finger 62 of a trigger 63 pivoted at 64 between said plates (Fig. 7). The trigger 63 has an ear 65 bent substantially at right angles thereto which projects freely through an opening 66 (Fig. 6) in the inside plate 41 for engagement by coin return mechanism to be described presently. When two five-cent coins are deposited in the rejector 49 both coins drop between plates 40 and 41 and the lowermost coin rests on the stop finger 62, as best shown in Fig. 7, while the second coin is seated edgewise upon the perimeter of the lower coin.

Figure 20:
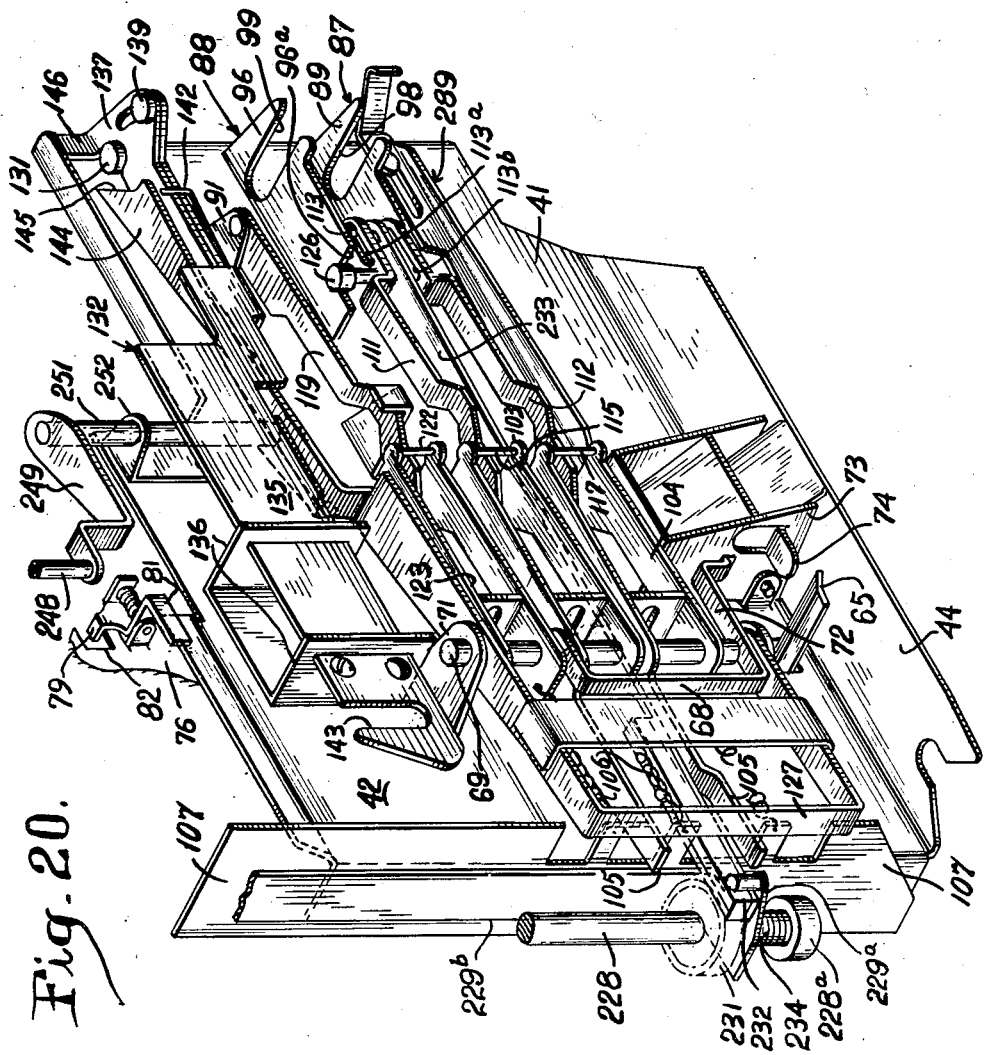
Fig. 20 is a perspective view of the lower portion of the device.

Additional coin-supporting means is provided to retain a ten-cent coin in a selected position within the space between the inside plate 41 and the auxiliary plate 42. Such means is best illustrated in Fig. 2 and is in the form of a blade 67 formed on the end of one arm of a U-shaped member 68 (Figs. 20 and 29) pivotally mounted on a journal pin 69 carried in ears 71 (Fig. 6) struck out of the auxiliary plate 42. The other arm 72 of said bracket has its free end offset at 72a (Fig. 29) and extended through an opening in one side wall of an inverted U-shaped pivotally mounted frame 73 (Fig. 20). Upon referring to Figs. 6 and 20 it will be observed that the said one wall of the frame 73 carries an ear 74 located substantially in the area of the trigger ear 65 for a purpose to be described hereinafter.

When a twenty-five cent coin is deposited in the rejector 49 it comes to rest on coin-supporting means provided in a space 75 (Fig. 10) provided between vertical walls 76 and 77 of an auxiliary plate assembly 78 arranged between the coin-controlled lock mechanism 17 and the rejector 49. This coin-supporting means, which is described in greater detail hereinafter, includes a lug 79 formed on the end of a detent 81 and which extends through an opening 82 in the wall 76.

The inside plate 41 of the coin-controlled mechanism 17 has a plurality of horizontally disposed vertically spaced slots 83, 84, 85, and 86 (Figs. 22 and 25), each to slidingly receive one of a plurality of flanges formed on a pair of slide plates 87 and 88 (Figs. 7, 26 and 27). The slide plate 87 is fabricated from sheet material substantially in the configuration illustrated in Fig. 27. As there shown it has a horizontal flange 89 on one of its edges which projects through the slot 83. A second horizontal flange 91, formed along another edge of said plate 87, extends through the slot 85. A third horizontal flange 92 also formed on the edge carrying the flange 91 thereon, but adjacent the opposite end thereof, is of sufficient width to project but slightly through another horizontally extending slot 93 in the inside plate 41. Slots 94 and 95 (Fig. 22) also are provided on the inside plate 41. Each of these three slots 93, 94, 95 has a complemental registering slot 93a, 94a, and 95a respectively provided in the auxiliary plate 42 (Figs. 24 and 25).

The other slide plate 88 likewise is provided with a pair of horizontal flanges, one of which, as at 96, extends through the slot 84 while the other flange 97 projects through the slot 86. The pair of flanges 89 and 96 are provided with notched recesses 98 and 99 respectively each of which is adapted to receive, in detachable engagement therewith, one of the rollers 36 (Fig. 2) on the free end of the crank-arm extensions 35. Upon referring to Figures 2 and 3 it is evident that when either one or both of the crank-arms 24 constituting a pair of crank-arms are rotated about their journal 23, the corresponding plate or plates 87 and 88 are shifted in a horizontal plane substantially from the full line positions illustrated in Fig. 7, into the positions there illustrated in dotted lines.

Such sliding movement of the plates 87 and 88 is prevented in the absence of a coin or coins of predetermined denominations and totaling a predetermined value (or exceeding such value by a predetermined amount) having been inserted in the coin-controlled mechanism. Means to prevent such sliding, in the absence of such coin or coins, includes stop lugs 101 and 102 (Figs. 7 and 31), one extending from an edge of the bight portions 103a of each of a pair of substantially identical U-shaped locking members 103 and 104. The locking members 103, 104 preferably are fashioned from sheet stock and their diverging legs 103b, 103c are pivotally mounted adjacent their free ends upon the vertically disposed journal pin 69 which extends through the aligned openings 103d, 103e. Each of these U-shaped locking members has a leg extension 105 (Figs. 6, 20 and 31) projecting beyond the journal pin 69. A pair of springs 106, each connected at one end to a respective one of said lock members and at its other end to an interrupted flange 107 formed on one vertical edge of the mounting plate 46, normally urge the U-shaped locking members 103, 104 inwardly toward the auxiliary plate 42 so as to maintain their respective stop lugs 101 and 102 projected into the space between the plates 40 and 41 and in the path of movement of the slide plate 87. Limited sliding movement of the slide plate 87 is permitted while the lugs 101, 102 are so positioned by reason of the clearance space between said lugs 101, 102 and shoulders 108 and 109 (Figs. 6 and 27) on said slide plate 87.

In order to permit free sliding movement of one or both of the slide plates 87 and 88 so as to permit actuation of the vending machine, which is operatively connected with said plates through the rollers 36, said slide plates carry coin-sensing means actuable to move the U-shaped locking members 103 and 104 into unlocking positions. The coin-sensing means carried on the slide plate 87 consists of a pair of cam arms 111 and 112 (Fig. 20) each of which is pivotally and slidably connected to the flange 89 on the slide plate 87 by means of a vertical stud 113 (Fig. 6) secured to the latter and projecting through slots 113a, 113b formed in arms 111, 112 respectively. This slotted connection between the cam arms 111 and 112 and the slide plate 87 permits limited sliding movement of said slide plate without longitudinal shifting of the cam arms. Such limited or initial sliding movement is, as noted hereinabove, limited by abutment of the shoulders 108 and 109 with the stop lugs 101 and 102 respectively.

Means is therefore provided on the cam arms 111 and 112, effective when said arms are shifted a sufficient distance longitudinally, to lift the U-shaped locking members 103 and 104 so as to carry their stop lugs 101 and 102 out of the path of the shoulders 108 and 109 to thereby permit the slide plate 87 to be shifted longitudinally through a complete cycle of operation.

As best shown in Fig. 2, the cam arm 111 has a cam edge 114 normally closely adjacent to the end wall 103a of the U-shaped locking member 103. Said locking member end wall 103a is cut away and bridged by a pin 115 beneath which the free end of the cam arm 111 extends. It should be apparent that when said arm is shifted longitudinally its cam edge 114 coacts with the pin 115 to thereby rock the locking member about pin 69 outwardly away from the inner plate 41 to move stop lug 101 out of the path of slide plate 87. Similarly, the cam arm 112 is provided with a cam surface 116 (Fig. 16) adapted to coact with a bridging pin 117 secured to locking member 104. When the cam arm 112 is shifted longitudinally during operation, the member 104 is rocked about its pivot 69 sufficiently to carry its stop lug 102 out of the path of the slide plate 87.

The specific mode and manner of operation and function of the slide plate 87, and of the related cam arms 111 and 112 carried thereby, will be more specifically referred to hereinafter. It is sufficient to note at this time, however, that the free ends of each of the cam arms 111 and 112 are provided with fingers 118 and 118a respectively, which fingers project through the related slots 94—94a and 95—95a respectively, in the plate assembly.

The projecting flange 91 on the slide plate 87 also carries a cam arm 119 (Figs. 17 and 20) suitably formed with a cam edge 121 adapted, under certain conditions of operation, to coact with a bridging pin 122 carried in the end wall or bight portion of a U-shaped member 123 pivotally mounted about the journal pin 69. The arm 119 also has a projecting finger 124 which extends freely through the registering slots 93—93a in the plate assembly.

The operation of the mechanism insofar as it has been described hereinabove is substantially as follows:

*Five-cent coin for five-cent merchandise*

Assuming the customer desires to purchase merchandise valued at five cents upon deposit of a five-cent coin, the five-cent coin "V" (Fig. 7) is inserted in the coin receiving slot 52 and subsequently comes to rest on the stop finger 62 in such position as to lie in the space between the forward edge 125 (Fig. 16) of the slide plate 87 and the projecting finger 118a of cam arm 112 (Fig. 16). The operator then grasps a plunger 18 associated with the rack containing the merchandise selected. The plunger 18 is then pulled outwardly. This causes both crank arms 24 of the related set of crank arms to rotate about their pintle pin 23, so as to move both drawbars and both slide plates 87 and 88.

As the side plate 87 moves in the upward direction as viewed in Fig. 16, the leading edge 125 thereof abuts the periphery of the coin "V" and moves the latter against the cam finger 118a of cam arm 112. Continued movement of slide plate 87 forces the coin "V" against cam finger 118a so as to move cam arm 112 in the same direction as slide plate 87. Were it not for the presence of coin "V," cam arm 112 would remain stationary since pin 113 secured to flange 89 is free to slide within slot 113b formed in cam arm 112. As the latter is moved by the coin "V," its cam edge 116 will engage pin 117 of locking member 104 to pivot the latter outwardly (in a clock-wise direction as viewed in Fig. 16) about the journal pin 69 so as to cause the stop lug 102 of locking member 104 to be withdrawn before the shoulder 109 of slide plate 87 reaches the position normally occupied by stop lug 102.

Advance of the slide member 87 past the withdrawn stop lug 102 normally would be prevented by the presence of the stop lug 101 on the locking member 103. This second locking of the slide plate 87 must necessarily be eliminated. It is for this reason that the vending of merchandise valued at five cents requires the sliding of the slide plate 88 in addition to the slide plate 87. Upon referring to Figs. 2, 6 and 20, it will be observed that the cam arm 111 has an upstanding pin 126 which projects into the path of the shoulder 96a (Fig. 26) of flange 96 on slide plate 88. Consequently, joint movement of both slide plates 87, 88 imparts positive forward advance of the cam arm 111, notwithstanding its slotted connection with the slide plate 87. This positive forward advance of the cam arm 111, during the interval while the slide plate 87 is advancing, permits the cam surface 114 of the cam arm 111 to engage and coact with bridging pin 115 on the locking member 103 to thereby rock the same and carry its stop lug 101 out of the path of the slide member 87. Such coaction of the cam surface 114 with the locking member 103 is occasioned by the fact that the cam arm 111 is formed with a flat surface 127 which rides upon the surface of auxiliary plate 42 with the result that its free end does not fall into the registering slots 94—94a while its cam surface 114 is moving beneath the pin 115.

During the dispensing of a five-cent piece of merchandise, the cam arm 119 also is advanced. However, said cam arm does not impede sliding movement of the slide plates and does not rock the locking member 123. This results from the absence of a coin in the path of the cam arm 119 which allows said arm to drop into the slots 93—93a while its cam surface 121 passes beneath the bridging pin 122 of locking member 123 without contacting pin 122. Upon referring to Fig. 17, it will be observed that as the slide plate 87 advances, the edge 128 of its flange 92 is engaged by a shoulder 129 on one edge of the cam arm 119 to thereby limit the movement of the cam arm into the registering slots 93—93a.

*Two five-cent coins for ten-cent merchandise*

The purchase of a ten-cent piece of merchandise may be effected by depositing two five-cent coins in the coin-controlled mechanism. Under such circumstances, both coins "V" and "N" will rest substantially in the positions shown in Fig. 7. The presence of a five-cent coin "V" in the lowermost position illustrated will act upon the associated cam arm 112 and locking member 104 in the manner described hereinabove.

The second coin "N" will be located in the space between the forward edge 125 of slide plate 87 and the cam finger 118 of cam arm 111 (Fig. 2). When the operator pulls a plunger associated with a stack of merchandise of the value of ten cents, only the bottom one of the related set of crank-arms 24 is actuated. Actuation of the lower crank-arm 24a in said set of crank arms imparts sliding movement to the lower drawbar 27 and slide plate 87 only. The slide plate 88 remains stationary.

As slide plate 87 is moved forwardly (upwardly as viewed in Fig. 2) the leading edge 125 of slide plate 87 will force the coin "N" against cam finger 118 to cause cam arm 111 to move along with slide plate 87 notwithstanding the free slotted connection 113, 113a therebetween and notwithstanding the fact that slide plate 88 remains stationary. That is, the coin "N" imparts the thrust to cam arm 111 to move the latter in the case where two nickels "V" and "N" are inserted, whereas when only a single nickel "V" is inserted the shoulder 96a of slide plate 88 abuts the pin 126 secured to cam arm 111 so as to cause movement of the latter.

As the cam arms 111, 112 move forwardly with the slide plate 87, the cam edges 114, 116 engage pins 115, 117 respectively of locking members 103, 104 to cause the latter to pivot outwardly about journal pin 69 so as to move both stop lugs 101, 102 out of the path of shoulders 108, 109 before the latter reach the positions normally occupied by said stop lugs. Slide plate 87 may now continue to advance the entire distance required to permit vending of the merchandise selected.

Ten-cent coin for ten-cent merchandise

The coin-controlled mechanism is adapted also to permit the vending of merchandise having a value of ten cents upon the deposit of a ten-cent coin. In such instance, a ten-cent coin "D" comes to rest in the space between the inside plate 41 and the auxiliary plate 42 and on the blade 67 formed on the end of the bracket 68 journaled on pin 69. This structure is best illustrated in Figs. 2 and 17. When a ten-cent coin is held in the manner aforesaid, it is located between the forward edge of the flange 92 on slide plate 87 and the projecting finger 124 of the cam arm 119 (Fig. 17). Only the slide plate 87 must be advanced in order to unlock the vending mechanism much in the same manner as when two five-cent coins were deposited. In this instance, however, the ten-cent coin holds the cam arm 119 in a position to cause its cam edge 121 to coact with the bridging pin 122 in the locking member 123 when the slide plates are advanced. This engagement rocks the locking member 123 clockwise as viewed in Fig. 17 about its pivot 69.

It should be noted that the locking member 123 does not have a stop lug of the kind carried by the other locking members 103 and 104. The locking member 123 has secured thereto a U-shaped element 127 which has its intermediate portion bridging and resting against the rearwardly extending legs 105 formed integral with the locking members 103 and 104. As a result of this mechanical association between the three locking members, rocking of the locking member 123 rocks the locking members 103 and 104 to thereby withdraw their locking lugs 101 and 102 out of the path of the slide 87. Consequently, the slide 87 may be shifted through its entire stroke to permit the vending of the piece of merchandise of the value of ten cents.

In each instance, operation of the coin-controlled mechanism described hereinabove, either by the deposit of one or two five-cent coins or of a ten-cent coin, is effective to discharge said coin or coins into a coin receptacle contained within the vending machine. This discharge and acceptance of the coins is accomplished by providing an outwardly offset portion 128 in the outside plate 40. Such offsetting of the portion 128 provides a relatively wide vertically disposed coin-receiving chamber 129 into which the coins carried forward by the advancement of the slide plate 87 are deposited. Coins entering said chamber fall through the open bottom thereof into a coin receptacle provided within the vending machine.

Vending of merchanidse having a five-cent value, upon the deposit in the coin-controlled mechanism of a ten-cent coin, or of merchandise valued at either five or ten cents upon the deposit of a twenty-five cent coin, is readily accomplished by the instant structure which is associated with means to vend one or more coins of predetermined denominations totaling the difference between the denomination of the coin deposited and the value of the merchandise purchased.

Ten-cent coin for five-cent merchandise

The following description is concerned with the vending of a five-cent coin as change when a ten-cent coin is deposited for obtaining a five-cent piece of merchandise.

As best shown in Figs. 18, 19 and 26, the projecting flange 97 on the slide plate 88 is apertured at 97a to receive a pin 131 firmly secured therein. A drive slide generally indicated at 132, includes a horizontal flange 133 (Fig. 30) suitably slotted, as at 134, to receive the pin 131 therethrough. The slide 132 also includes a vertically disposed plate-like portion 135 which is disposed wholly above the horizontal flange 133 and is guided for longitudinal sliding in a U-shaped bracket 136 mounted on the face of the auxiliary plate 42.

In order to operate the five-cent change delivery mechanism to be described in detail presently, the slide 132 must be slid longitudinally as an integral part of the slide plate 88.

During machine operation involving longitudinal shifting of the plate 88, in instances where no change need be returned to the operator, the pin 131 is conditioned so as to slide freely in the slot 134 without imparting any sliding movement to the slide 132.

Such releasable locking together of the slide plate 88 and slide 132 as is required for the different modes of operation is best effected by providing a latch 137 on the upper face of the horizontal portion 133 of slide 132. The latch 137 is pivotally secured at one end to said horizontal portion, as at 138, and its free end is held against unlimited displacement by a pin and slot connection 139. Normally, a shoulder 141 provided on one edge of the latch 137 is held in engagement with the pin 131 by a torsion spring 142 associated therewith. Obviously, longitudinal shifting of the slide member 88 while the latch 137 remains engaged with the pin 131 will cause said slide 132 to be carried along with pin 131 and slide plate 88.

The free or projecting end of the vertically disposed bracket portion 135 is provided with a notch or recess 143 which affords means for operatively connecting the bracket 132 with the five-cent coin return mechanism. This mechanism will be described in detail hereinafter.

In order to effect disengagement between the slide 132 and the slide member 88 under conditions of operation not requiring the return of a coin, means is actuated to disengage the latch 137 from the pin 131. To this end, the U-shaped element 127 secured to the locking member 123 is provided with a forwardly extending arm 144 (Figs. 18, 19, 20 and 28) having a shoulder 144a normally resting against the inside wall 41. The forward end of the arm 144 is provided with an inclined cam surface 145.

When two five-cent coins or a ten-cent coin is inserted in the coin-controlled mechanism for the purpose of obtaining a ten-cent article of merchandise, only the slide plate 87 is advanced while the slide plate 88 remains stationary. When both slide plates are shifted during the purchase of a five-cent article of merchandise upon the insertion of a five-cent coin, the cam surface 145 is adapted to coact with a lug 146 on the free end of the latch 137 during initial advancement of the latch and its component parts. When the latch lug 146 contacts the cam surface 145, the latch, during initial advance of the slide plate 88, is rocked about its pivot 138 in the manner best shown in Fig. 19 to thereby disengage its shoulder 141 from the pin 131. Consequently, the slide plate 88 is free to advance the entire distance of its sliding movement without carrying the slide 132 therewith.

When a ten-cent coin is deposited in the coin-controlled mechanism for the purchase of a five-cent article of merchandise, the cam arm 119 rocks the locking member 123 thus lifting the arm 144 sufficiently to permit the latch lug 146 to pass freely therebeneath without disengaging the latch 137 from pin 131. As a result, the slide 132 moves with the slide plate 88 so as to actuate the change making mechanism now to be described.

The change coin vending means provided in the present vending machine and operable to vend a five-cent coin when a ten-cent coin is deposited for a five-cent piece of merchandise, is operatively associated with the longitudinally reciprocal slide 132. Upon reference to Fig. 4, it will be observed that the slide plate 135 is fragmentarily illustrated in broken lines. As shown, the recess 143 in the free end of the plate is engaged at all times by a roller 147 carried on the lower end of an adjustable bell-crank lever 148. The portion 149 of said bell-crank lever 148 carries the roller 147 and is slideably connected to an arm 151 of said bell-crank lever as by means of pins 152 and slot 153. A spring 154 normally holds the slideable member 149 in the lowermost position of adjustment illustrated. When the machine cabinet is open to permit servicing, a manually engageable lever 155, pivotally mounted at 156 and pivotally connected at 157 to the slide member 149 may be rocked counterclockwise about pivot 156 to raise the member 149 to elevate the roller 147. This permits engagement of the roller 147 in the recess 143 during mounting of the coin-controlled mechanism on the vending machine.

*Main change vending mechanism*

The bell-crank lever 148 is pivotally mounted on a pivot 158 projecting outwardly from a mounting plate 159 (Fig. 4) fixedly secured, as by means of bolts and nuts 161, to the end wall of the rack assembly adjacent to the coin-controlled mechanism 17. The other arm 162 of said bell-crank lever 148 is pivotally connected at 163 to one end of a link 164 which extends upwardly angularly therefrom and has its upper end pivotally secured at 165 to the end of one arm 166 of a second bell-crank lever generally indicated at 167. The bell-crank lever 167 is pivotally mounted on the plate 159, at 168, and its other arm 169 carries an adjusting screw 171 adapted to cooperate with a bearing block 172 on a link 173 pivotally mounted at one end on the pin 168. The other end of said link 173 carries a roller 174. The adjustable mounting of the link 173 relative to the bell-crank 167 is provided to facilitate accurate coordination of the coin-controlled mechanism with the five-cent change vending mechanism now to be described.

Still referring to Fig. 4, the upper margin of the mounting plate 159 terminates in an inclined horizontal flange 175. This flange is provided with a circular flanged opening 176 of such size as to receive snugly therein a tube 177 adapted to contain a stack of five-cent coins. A plurality of bolts 178 having suitable spacers thereon afford means for securing a bottom plate 179 on the bottom face of the flange 175 but in spaced relationship thereto. A reciprocal gate plate 181, best shown in Fig. 5, is slideably mounted between the flange 175 and plate 179. This gate plate 181 has a slotted aperture 182 of sufficient size to receive and engage the roller 174 on the upper end of the link 173.

The gate plate 181 also is provided with a circular opening 183 which normally underlies the tube 177. A similar opening 184 is provided in the bottom plate 179 but is offset to the right, as viewed in Figs. 4 and 5, so as to communicate with an inclined chute 185 located therebeneath and firmly secured to the vertical plate 159. The lower end of the chute is in direct communication with a coin passageway 186 formed in the mounting plate 159, as by offsetting a portion thereof throughout substantially its entire length.

It should be apparent at this time that when the slide 132 is shifted longitudinally (to the right as viewed in Fig. 4) during the operation of the coin-controlled mechanism following the deposit of a ten-cent coin for a five-cent piece of merchandise, the bell-crank 148 is rocked counterclockwise (as viewed in Fig. 4) to pull the link 164 downwardly and rock the bell-crank 167 in a clockwise direction so as to move the gate plate 181 from a position where its coin receiving opening 183 aligns with the tube opening 262 into a position where said opening 183 registers with the opening 184 to thereby deposit a single coin, in this instance, a five-cent piece, into the chute 185 for discharge through the passageway 186 and onto the coin-return ledge 61.

*Ten-cent coin blocking mechanism*

Means is provided to prevent the acceptance of a ten-cent coin, should the change coin tube 177 be empty. Such means is best shown in Figs. 4 and 6. Referring to Fig. 4, the horizontal flange 175 has slideable thereover a strap 187 formed with an upstanding finger 188 on the end disposed closely adjacent to the tube 177. This finger is adapted to extend through an opening 189 in the tube wall and bears against the coins therein. The strap 187 has its rearwardly disposed end turned downwardly as at 191 for a purpose to be explained hereinafter.

An upstanding ear 192 on said strap 187 has fixed thereto a lateral pin 193 that extends through a slot 194 in the upper end of a rock arm 195 pivotally mounted at 196 to an overhanging flange 197 on the assembly mounting plate 159. The lower end of the arm 195 terminates a considerable distance below its pivotal mounting and is adapted to cooperate with a trigger 198 (Figs. 4 and 6) mounted on and operatively associated with the rejector 49. Upon referring to Fig. 6, it will be noted that the trigger 198 is formed by offsetting the medial portion of a rod 199 journaled at 201 on the back face of a bearing strap 202. A spring 203, bearing at one end against the trigger 198 and secured at its other end by a screw 204 normally holds the trigger firmly in contact with the rock arm 195.

The lower end of the trigger rod 199 is bent substantially at right angles thereto to provide a lateral portion 205 integral with a downwardly inclined portion 205a having an inturned end portion 206 adapted to enter through a hole 207 in a side wall of the rejector 49 so as to be disposed in the path of a ten-cent coin passing through the rejector.

When the change coin tube 177 contains a supply of five-cent coins, the strap 187 is held in a rearwardly adjusted position to thereby hold the lower end of the rock arm 195 in position to hold the trigger 198 turned against the action of its spring 203, and thereby to hold the inturned end portion 206 out of the ten-cent coin passageway. As a result, ten-cent coins deposited in the rejector 49 move through their normal path of travel and are received and deposited in a position to permit actuation of the coin-controlled mechanism 17. However, should the change tube 177 be empty of five-cent coins, the pointed end of the strap finger 188 enters the tube 177, thus moving the rock arm 195 away from the trigger to allow its end portion 206 to enter the coin path. As a result, any ten-cent coin deposited in the rejector is diverted by said end portion 206 into the coin-return passageway 58 for return to the customer.

The construction of the change coin discharge mechanism and ten-cent coin-reject mechanism just described is such that each time the change coin discharge mechanism is actuated, the slide strap 187 of the coin-reject mechanism is shifted away from the tube 177 to relieve the lowermost coin or coins in the stack therein of any pressure so that said coins may drop downwardly in said tube as successive coins are withdrawn. This shifting is effected by the presence of the downturned end portion 191 on the strap 187. Upon referring to Fig. 5, it will be observed that said downturned portion lies in the path of the gate plate 181 so that when the latter is shifted to the right, as viewed in Fig. 5, its leading edge strikes the end portion 191 and carries the strap 187 therewith a short distance.

The uppermost end of the change coin tube 177 is provided with means to prevent fraudulent spilling of coins through the upper end thereof should the vending apparatus be inverted. Accordingly, a flanged bracket 208 is secured, as by bolts 209, to the end wall 210 of the right hand rack, which bracket includes a horizontal flange 211 suitably apertured at 212 to receive the upper end of the change tube 177. A slide plate 213 mounted on the horizontal flange 211, carries a hopper-shaped receptacle 214 which communicates with an opening 215 in the slide plate. The opening normally is held in register with the open upper end of the tube by a tension spring 216. This construction is such that the opening 215 is in register with the upper end of the tube 177 when the front wall of the cabinet is moved away for the purpose of inserting a supply of coins. When the cabinet wall is replaced it abuts the front end of the hopper 214 and urges it and its slide plate rearwardly against the action of compression spring 216 to block the tube opening.

Twenty-five cent coin mechanism

As noted hereinbefore the coin-controlled mechanism 17 is adapted to be unlocked to permit the vending of merchandise valued at five or ten cents upon the deposit of a twenty-five cent coin. In such operation, coins having a total value of fifteen cents are vended to the customer when a ten-cent piece of merchandise is obtained and coins totaling a value of twenty cents are vended when merchandise valued at five cents is obtained. The operation of the mechanism is such that when a twenty-five cent coin is deposited to obtain merchandise valued at ten cents, auxiliary change vending mechanism best illustrated in Figures 6, 8 through 14 is rendered operable for vending a ten-cent coin and a five-cent coin as change. When merchandise valued at five cents is to be purchased upon the deposit of a twenty-five cent coin, the said auxiliary change vending mechanism and the five-cent change vending mechanism previously described are brought into operation so as to vend two five-cent coins and one ten-cent coin as change.

The auxiliary plate assembly 78 includes the walls 76 and 77 which are substantially rectangular in outline and also a pair of overlying plates 217 and 218 (Fig. 11) arranged adjacent the front face of but spaced from plate 76 and from each other so as to provide coin passages 219 and 221 leading from the rejector 49 to the coin-controlled mechanism 17. A twenty-five cent coin deposited in the rejector 49 is directed into a coin passageway 222 (Figs. 11 and 12) from where it passes into position on the coin-supporting means or lug 79 (Fig. 10). When the coin is in this position it is adapted to cooperate with a slide mechanism best illustrated in Fig. 13 and to be described presently. This mechanism, or coin-release means, is mounted on a horizontal flange 223 formed integral with the wall 76 and extending laterally therefrom, as best shown in Figs. 6 and 13.

The slide mechanism is best illustrated in Fig. 13 and it includes a substantially rectangular slide plate 224 and a coin-sensing finger 225. The coin-sensing finger 225 extends beyond the related end of the horizontal flange 223 and terminates in a rack 226 that meshes at all times with a gear 227 fixedly mounted on the upper end of a shaft 228. The shaft 228 is journaled in a vertical position in bearings 229 (Fig. 9) mounted in horizontally extending ears 229a of a bracket 229b secured on the flange 107 of the coin-controlled mechanism 17. Shaft 228 carries adjacent its lower extremity a second gear 231 which is meshed with a rack 232 formed on the extreme end of a link 233 (Figs. 6 and 20), the other end of which is pivotally secured to the vertical stud 113 conecting the coin-sensing fingers or cam arms 111 and 112 to the slide plate flange 89. The extreme lower end of the shaft 228 carries a fixed collar 228a to which is anchored one end of a spring 234 coiled about the lower end of the shaft 228. The other end 235 of said spring bears against the flange 107 so as to normally urge the shaft 228 in a counterclockwise direction (as viewed in Fig. 13) to maintain all of the parts associated therewith in the positions substantially as illustrated in Figs. 6, 13, 20 and 21.

The gear and rack connection between the coin-sensing finger 225 and the coin-controlled mechanism 17 is such that when the coin-controlled mechanism is unlocked to permit sliding of either or both of the slide plates 87 and 88, the coin-sensing finger 225 is moved to the left as viewed in Figs. 13 and 14. The coin-sensing finger 225 is adapted to cooperate with a twenty-five cent coin "Q" when the latter is in the space 75 and supported on the coin-supporting lug 79 as shown in Fig. 14. It will be observed that the coin will lie in a recess 236 formed on one edge of the coin-sensing finger 225 so that when said coin-sensing finger is moved to the left during machine operation the coin is abutted by a shoulder 237 on an end projection 237a of finger 225 and is carried with the finger and deposited in the coin-acceptance passageway 129.

The presence of a coin in the recess 236 holds the coin-sensing finger 225 in such position that it is maintained in locking engagement with the slide plate 224 so as to cause said slide plate to move in unison therewith. This locking engagement is accomplished by providing an edge of the finger 225 with a recess 238 in which a pointed projection 239, formed on the slide plate 224, normally rests. The purpose and specific function of the slide plate 224 will be described presently, but it might be observed at this time that it is adapted to unlock the coin-controlled mechanism 17 when a twenty-five cent coin is positioned in associaton therewith and further, to cause the vending of change coins. In the event that the coin-controlled mechanism is operated in response to the deposit of a five-cent coin or of a ten-cent coin or of two five-cent coins in the coin-controlled mechanism 17, the coin-sensing finger 225 is free to move laterally out of engagement with the slide plate 224 and to move longitudinally independently of slide plate 224.

Jamming of the mechanism due to one type of attempted fraudulent operation is prevented by a pawl 243 (Figs. 6 and 8) pivotally mounted at 244 on a flange 245 secured to and extending outwardly from plate 218. A spring 246 tends to urge the free end of pawl 243 inwardly into the space 75, but the pawl 243 is normally held outwardly against the action of the spring by the end of an arm 241 fixedly secured to the coin-sensing finger 225. Said end of arm 241 engages an angularly disposed cam lip 242 of pawl 243 when finger 225 is in its normal rest position (at the right-hand end of its travel as viewed in Fig. 8), so as to maintain pawl 243 in its normal withdrawn position shown in Fig. 8. When slide plates 87, 88 are in their normal rest positions (to the right as viewed in Figs. 6 and 20) the coin passage 75 is unobstructed by pawl 243 so that the machine will accept twenty-five cent coins. However, if slide plate 87 is moved to the left, coin sensing finger 225 and arm 241 thereof are also moved to the left so as to permit spring 246 to urge pawl 243 into the coin passage 75 thereby blocking the latter so that if a second twenty-five cent coin is in passage 75 pawl 243 will hold the coin in place and prevent it from dropping. Also, pawl 243 prevents the mechanism from being jammed by dropping a twenty-five cent coin into the mechanism when slide plate 87 has been moved to an advanced position after having been unlocked by the insertion of a quarter or a dime. If it were possible to insert a quarter into the mechanism at this time without first allowing the slide plate 87 to return to its normal position, the quarter would drop into the recess 236 while finger 225 is in an advanced position (to the left as viewed in Fig. 8). This would prevent finger 225 from returning to its normal position due to the presence of the quarter and the mechanism would be jammed so as to require servicing.

When there is no coin in the recess 236 of the coin-sensing finger 225, the pointed projection 239 on the slide plate 224 will cooperate with one edge of the recess 238 to urge the coin-sensing finger upwardly as viewed in Fig. 13 until projection 239 moves out of engagement with recess 238 thereby permitting the coin-sensing finger 225 to slide independently of plate 224. When the coin-sensing finger is returned to its initial position, the end projection 237a rides upon an inclined edge 224a on plate 224 to return the coin-sensing finger 225 to normal position and to hold it against displacement due to the tendency of spring 246 to urge shaft 228 counter-clockwise. However, when a twenty-five cent coin is engaged by the coin-sensing finger 225, the slide plate 224 is moved in unison with said coin-sensing finger.

Initial movement of the slide plate 224 carries a cam surface 247 on its edge into engagement with a roller 248 carried on the upper end of an arm 249 fixedly secured to a vertical shaft 251 (Fig. 6) journaled at 252 on the inside face of the coin-controlled mechanism 17. The lower end of the shaft 251 has firmly secured thereto an arm 253 formed on its end with a lug 254 which extends adjacent the edge of arm 144 (Fig. 18) for moving the latter into a position that will permit the lug 146 on the lock lever 137 to slide therebeneath during operation of the coin-controlled machine. This same movement of the arm 144 rocks the U-shaped strap 127 (Fig. 6) against the tail portions 105 of the locking members 103 and 104 to thereby unlock the coin-controlled mechanism.

Twenty-five cent coin for five-cent merchandise

As previously described hereinabove, when merchandise valued at five cents is to be vended, the slide plate 88 on the coin-controlled mechanism is operated by a plunger 18 and a respective lower one of the crank-arms 24. Consequently, when a twenty-five cent coin is inserted to obtain vending of merchandise valued at five cents, the drive slide 132 is moved jointly with movement of the slide plate 88 in the same manner as occurs when the machine is operated in the presence of a ten-cent coin for the purchase of merchandise valued at five cents so as to operate the main change coin mechanism previously described so as to return to the operator a five-cent coin.

However, it is also necessary to return an additional fifteen cents in change. Such additional coin return is effected through operation of the slide plate 224 which is operatively associated with a pair of change coin containers 255 and 256. The container 255 is adapted to contain ten-cent coins and the container 256 is adapted to contain five-cent coins. Each of these containers is in the form of a tube mounted in an upright position in a cap plate 257 mounted on the flange 223, which plate is suitably recessed on its bottom face to slideably receive the slide plate 224. The top face of the slide plate (Fig. 13) is formed with a shallow recess 258 having a bayonet-type opening 259 adjacent one end, the larger diameter of which normally underlies the open bottom end of the five-cent change tube 256 so as to have seated therein at all times a five-cent coin. The other or smaller end of the opening 259 is of a size to receive a ten-cent coin therein when the slide plate is shifted into position to locate said opening in registering alignment with the open bottom end of the ten-cent change tube 255.

Accordingly, when the slide plate 224 is moved in unison with the coin-sensing finger 225, during a vending operation following the deposit of a twenty-five cent coin for a piece of merchandise valued at five cents, the plate 224 will initially carry the five-cent coin seated therein over an opening 261 (Fig. 13) in the base flange 223 and said coin falls into a trough 262 (Fig. 12) for delivery into the coin-return passageway 58. When the slide plate 224 reaches the limit of movement in one direction, while discharging the five-cent coin, a ten-cent coin becomes seated in the opening 259 and when the slide plate returns to its initial position the ten-cent coin is carried over the opening 261 whereupon it falls therethrough into the chute 262 for delivery into the coin return passageway 58. It will thus be observed that when a twenty-five cent coin is deposited for a purchase of merchandise valued at five cents, two five-cent coins and one ten-cent coin are returned to the customer.

Twenty-five cent coin for ten-cent merchandise

When a twenty-five cent coin is deposited for the purchase of a piece of merchandise valued at ten cents, the drive slide 132 associated with the main five-cent change coin return mechanism remains inoperative as previously discussed herein owing to sliding movement of the plate 87 only. However, the roller 248 is displaced by sliding of the slide plate 224 in the same manner as before so as to effect unlocking of both of the coin locks 103 and 104 in which instance a ten-cent coin and a five-cent coin are returned as change from the auxiliary change mechanism.

Twenty-five cent coin blocking mechanism

Figure 21:
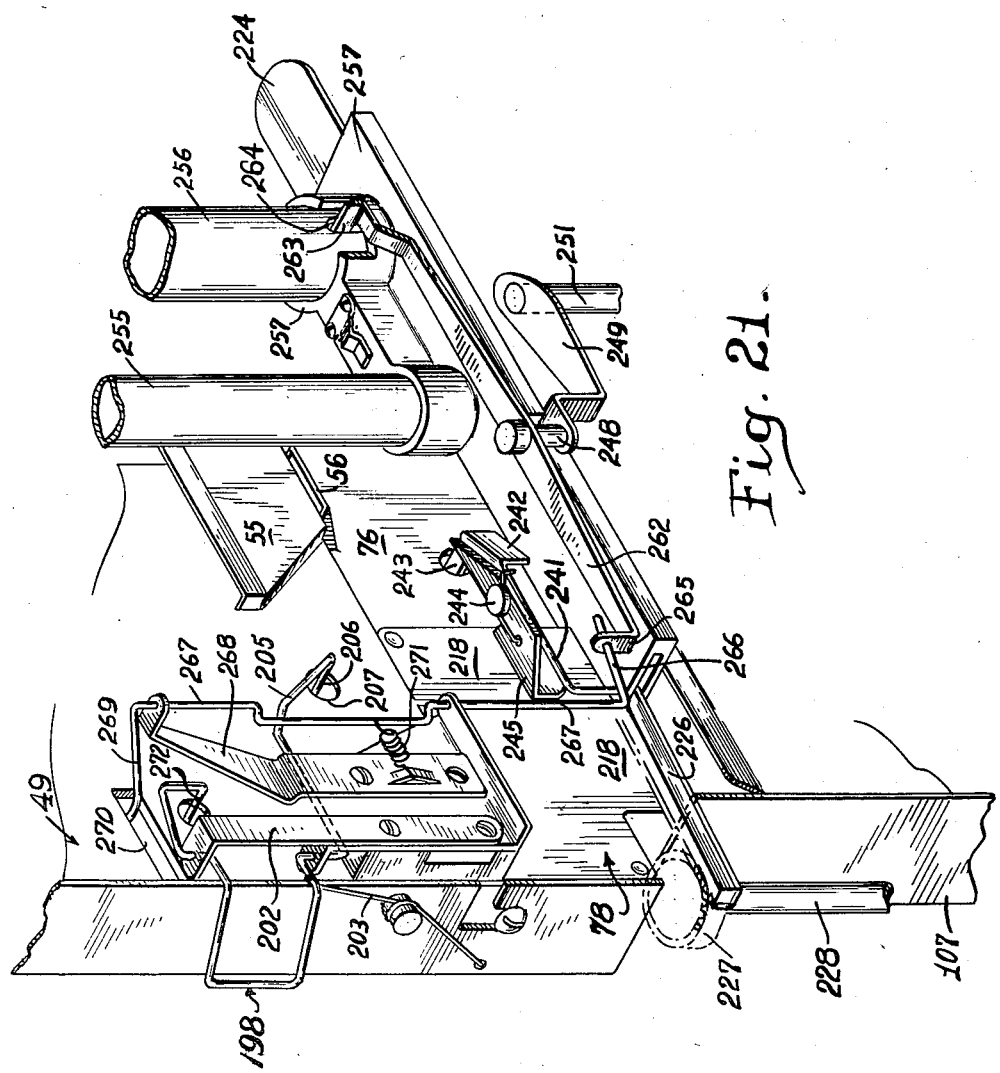
Fig. 21 is a perspective view of the upper portion of the device immediately above the portion shown in Fig. 20.

Should the supply of five-cent change coins in the coin tube 256 become depleted means is provided to prevent entrance of a twenty-five cent coin. This means is best shown in Figs. 6, 8 and 21. As illustrated, a bell-crank arm 262 is pivotally mounted intermediate its ends on the bearing for the roller 248. One of its ends has a finger 263 adapted to enter an opening 264 in the tube 256 and its other end arm 265 is engaged at all times with a horizontally extending tail portion 266 of a vertical rod 267 journaled in a bracket 268 and arranged to overlie the rejector 49. The upper extremity of the rod 267 is bent substantially at right angles thereto, as at 269, and is arranged to project through an opening 270 in one wall of the rejector 49 so as to lie in the path of any twenty-five cent coins deposited in the rejector and deflect them into the coin-return chute 55—56 (Fig. 6). A spring 271 (Fig. 21) normally urges the finger 263 into the coin tube 256 but when there are coins within said tube the upper extremity 269 of the rod 267 is held out of the path of the coins so as to permit a coin to be received in the coin-receiving means.

In a like manner the trigger 198 (Figs. 6 and 21), previously referred to in connection with blocking the entrance of ten-cent coins in the event the main five-cent coin tube is empty, also functions to prevent the passage of a twenty-five cent coin when said change-coin tube 177 is empty. As best shown in Fig. 21, the upper extremity of trigger 198 has a horizontal end portion 272 which normally is held out of the path of a twenty-five cent coin but which will be projected into such path when the trigger 198 is released through operation of the holding lever 195 which is responsive to the presence or absence of coins in the main coin-change tube 177.

Return of deposited coins

Should a customer desire that any coin or coins deposited in the coin slot 52 be returned to him without operating the machine and obtaining the merchandise originally selected, he may actuate suitable coin discharge means. Such means is best shown in Figs. 4 and 6 and it includes a bell-crank lever 273 pivotally mounted at 274 on the outside face of the rack end wall 210. The bell-crank lever 273 has an arm portion 275 which extends upwardly from the pivot 274 through a guide bracket 276 and has on its free end an angularly disposed finger-engaging portion 277. This finger-engaging portion 277 is located to the rear of an opening 278 in the front wall of the vending machine housing 12.

The other arm 279 of said bell-crank lever 273 extends rearwardly and downwardly from the pivot 274 and then horizontally to dispose its free end 281 through a slot in a vertical guide flange 282. A spring 283 having one end connected to the arm 279 and its other end anchored in the bracket 276 normally retains the bell-crank lever in the position of rest illustrated in Fig. 4.

A lug 284 extending outwardly from one face of the bell-crank arm 279 is disposed immediately above the coin supporting detent 81 (Figs. 6, 10 and 20) so that when the bell-crank lever 273 is rotated in a clockwise direction, the lug 284 will move said detent 81 to withdraw lug 79 from its normal position and thereby to release a deposited quarter. Such coins as are released fall into the coin return chute 57—58 and are returned to the customer.

Movement of the bell-crank lever 273 acts also to depress a bar 285, loosely connected thereto as by means of a rivet 286, which extends vertically between the mounting plate 159 and the coin-controlled mechanism 17 and has its lower end bent substantially at right angles thereto to define a foot portion 287 that overlies both of the lugs 65 and 74 (Fig. 6). A spring 288 retains the bar 285 in actuable position with relation to the bell-crank lever 273 but, when said bell-crank lever is rotated to actuate the coin supporting detent 81, the bar 285 is carried downwardly thereby so that its foot portion 287 engages the lug 65 to rock the coin-support trigger 63 (Fig. 7). The foot portion 287 of bar 285 also engages lug 74 (Fig. 20) to pivot U-shaped frame 73 which imparts rocking motion to the U-shaped bracket 68 sufficiently to withdraw the coin-supporting blade 67 (Fig. 2) out of the path of any coins lying in the space between auxiliary plate 42 and inside plate 41 of the plate assembly. Such coins as are released upon withdrawal of the coin supporting blade 67 and the rocking of trigger end 63 drop onto the inclined surface of the coin return chute 59 and are returned to the customer.

Unlocking while servicing

During the servicing of the machine, it frequently happens that the merchandise contained in one or more of the racks 15 is removed and merchandise of another kind or value is substituted therefor. Should the rack to be emptied be substantially filled, considerable time would be involved in separately removing each piece of merchandise contained therein.

Accordingly, means is provided whereby the coin-controlled mechanism may be conditioned to permit operation of all of the plungers associated with all of said racks without the insertion of any coins. Upon referring to Fig. 6, it will be observed that the inside plate 41 of the coin-controlled mechanism 17 has slideable upon its exposed face a cam element 289. This element comprises a bar 291 having on one edge a plate 219a formed with a pair of slots 292, to receive therethrough mounting pins 293.

A cam lip 294 integral with the rear free end of said bar extends at right angles thereto and underlies the lower edge of the locking element 104 in such manner that when the element 289 is pulled outwardly, or to the right as viewed in Fig. 6, said lip coacts with a cam surface 295 (Fig. 16) on said locking element 104 to elevate said locking element a distance sufficient to withdraw its locking lug 102 (Fig. 7) out of the path of the slide plate 87. The rear end of bar 291 is provided with an extension 296 having a cam lip 296a to cooperate with a similar cam surface provided on the other locking element 103. Accordingly, movement of the cam element 289 in a direction to raise the cam locking element 104 is effective, also, to elevate the locking element 103 and thereby remove its locking lug 101 out of the path of the slide 87.

In order to prevent inadvertent nonsetting of the cam element 289 after it has been moved into its unlocking position, the forward free end of said element lies immediately behind the rear surface of the front wall of the cabinet 12. Consequently, it cannot be moved or retained in unlocking position under any conditions other than when the vending machine cabinet is open. Immediately upon closing said vending machine cabinet, the cam element 289 is contacted by the front wall thereof and is moved into its normal ineffective position.

The upper ends of the coin tubes 255 and 256 (Figs. 6 and 15) may be closed by a slide plate 297 mounted on a connecting flange 298 joining the tubes. The slide plate 297 is shown in Fig. 15 in open position and is moved to the left to close the tubes to prevent spilling of coins should the machine be inverted.

It is believed that our invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of our invention as defined in the appended claims.

What we claim and desire to secure by Letters Patent of the United States is:

1. A vending machine comprising a first vending means actuable to dispense articles for five cents, a second vending means actuable to dispense articles for ten cents, means moveable in response to actuation of either of said vending means, means normally locking said moveable means to prevent substantial movement of the latter and deactuable to release said moveable means, means coacting with said vending means and said moveable means for preventing actuation of said vending means when said moveable means are locked by said locking means, means for receiving inserted nickels, dimes and quarters, means for deactuating said locking means in response to insertion of a nickel followed by actuation of said first vending means, means for deactuating said locking means in response to insertion of a dime followed by actuation of either of said vending means, a first change container for storing a supply of nickels to be vended as change, means for vending a nickel from said first change container in response to insertion of a dime followed by actuation of said first vending means, a second change container for storing a supply of nickels to be vended as change, a third change container for storing a supply of dimes to be vended as change, additional means for deactuating said locking means in response to insertion of a quarter followed by actuation of either of said vending means, means responsive to insertion of a quarter followed by actuation of said first vending means for vending a first nickel from said first change container and a second nickel from said second change container and a dime from said third change container, and means responsive to insertion of a quarter followed by actuation of said second vending means for vending a nickel from said second change container and a dime from said third change container.

2. A vending machine as recited in claim 1 wherein said additional means comprises a longitudinal coin sensing finger mounted for both reciprocal movement in a longitudinal direction and movement in a lateral direction, drive means connecting said moveable means and said finger for moving said finger longitudinally in response to movement of said moveable means, means for locating an inserted quarter in a position adjacent to said finger, means on said finger for engaging said located quarter to prevent substantial lateral movement of the finger when said quarter is in said adjacent position, and means for deactuating said locking means in response to longitudinal movement of said finger only when the finger is prevented by the quarter from moving laterally.

3. A vending machine as recited in claim 2 wherein said last-recited means comprises a moveable element, mutually coacting cam means on said finger and said element and engageable for moving the element in response to longitudinal movement of the finger when the latter is held against lateral movement by said located quarter, said cam means being disengageable in response to said lateral movement of said finger to permit longitudinal movement of the finger without movement of said element, and means for deactuating said locking means in response to movement of said element.

4. A vending machine as recited in claim 2 wherein said drive means comprises a rack on said finger, a rotatably mounted shaft, a gear secured to said shaft and drivingly engaged with said rack, and means for rotating said shaft in response to movement of said moveable means.

5. A vending machine as recited in claim 4 wherein said rotating means comprises a second gear secured to said shaft, a second rack engaging said second gear, and means connecting said second rack and said moveable means.

6. A vending machine comprising a first vending means actuable to dispense articles at a first price, a second vending means actuable to dispense articles at a second price higher than said first price, means moveable in response to actuation of either of said vending means, means normally locking said moveable means to prevent substantial movement of the latter and deactuable to release said moveable means, means coacting with said vending means and said moveable means for preventing actuation of said vending means when said moveable means is locked by said locking means, means for receiving various coins of at least three different denominations of which the two lower denominations are respectively equal in amount to said first and second prices, means for deactuating said locking means in response to insertion of a coin of the lowest of said denominations followed by actuation of said first vending means, means for deactuating said locking means in response to insertion of a coin of intermediate denomination followed by actuation of either of said vending means, means for containing a supply of coins to be vended as change, means for vending said change coins in an amount equal to the difference between said intermediate denomination and said first price in response to insertion of said coin of said intermediate denomination followed by actuation of said first vending means, additional means for deactuating said locking means in response to insertion of a coin of the highest denomination followed by actuation of either of said vending means, and means responsive to insertion of a coin of said highest denomination followed by actuation of either of said two vending means for vending said change coins in an amount equal to the difference between the highest denomination and the respective price of the vending means which is actuated.

7. A vending machine as recited in claim 6 wherein said additional means comprises a longitudinal coin sensing finger mounted for both reciprocal movement in a longitudinal direction and oscillatory movement in a lateral direction, drive means connecting said moveable means and said finger for moving said finger longitudinally in response to movement of said moveable means, means for locating said inserted coin of highest denomination in a position adjacent said finger, means on said finger for engaging said adjacently located highest denomination coin to prevent substantial lateral movement of the finger when said coin is present in said adjacent position, and means for deactuating said locking means in response to longitudinal movement of said finger only when the finger is prevented by said highest denomination coin from moving laterally.

8. A vending machine as recited in claim 7 wherein said last-recited means comprises a moveable element, mutually coacting cam means on said finger and said element and engageable for moving the element in response to longitudinal movement of the finger when the latter is held against lateral movement by said adjacently located highest denomination coin, said cam means being disengageable in response to lateral movement of said finger to permit longitudinal movement of the finger without movement of said element, and means for deactuating said locking means in response to movement of said element.

9. A vending machine as recited in claim 7 wherein said drive means comprises a rack on said finger, a rotatably mounted shaft, a gear secured to said shaft and drivingly engaged with said rack, and means for rotating said shaft in response to movement of said moveable means.

10. A vending machine as recited in claim 9 wherein said rotating means comprises a second gear secured to said shaft, a second rack engaging said second gear, and means connecting said second rack and said moveable means.

References Cited in the file of this patent

UNITED STATES PATENTS

| | | |
|---|---|---|
| 541,298 | Sturgis | June 18, 1895 |
| 2,655,244 | Stoner | Oct. 13, 1953 |
| 2,660,284 | York | Nov. 24, 1953 |
| 2,777,554 | Steiner | Jan. 15, 1957 |